United States Patent [19]

Lipo et al.

[11] Patent Number: 5,661,390

[45] Date of Patent: Aug. 26, 1997

[54] INVERTER-FED MOTOR DRIVE WITH EMI SUPPRESSION

[75] Inventors: Thomas A. Lipo, Middleton; Erkuan Zhong, Madison, both of Wis.

[73] Assignee: Electric Power Research Institute, Inc., Palo Alto, Calif.

[21] Appl. No.: 494,307

[22] Filed: Jun. 23, 1995

[51] Int. Cl.⁶ .................................................. H02M 1/12
[52] U.S. Cl. ........................ 318/803; 318/802; 318/492; 363/82
[58] Field of Search .......................... 363/37, 71, 82, 363/39, 35, 51, 126, 41, 42; 318/492, 801, 802, 803, 647, 821, 822, 797

[56] References Cited

U.S. PATENT DOCUMENTS

| | | | |
|---|---|---|---|
| 4,651,266 | 3/1987 | Fujioka et al. | 363/39 |
| 4,673,851 | 6/1987 | Disser | 318/341 |
| 4,783,728 | 11/1988 | Hoffamn | 363/37 |
| 4,800,478 | 1/1989 | Takahashi | 363/41 |
| 4,875,148 | 10/1989 | Roe et al. | 363/98 |
| 4,977,492 | 12/1990 | Kirchberg, Jr. et al. | 363/41 |
| 4,994,951 | 2/1991 | Iwasa et al. | 363/41 |
| 5,001,619 | 3/1991 | Nakajima et al. | 363/41 |
| 5,017,800 | 5/1991 | Divan | 363/37 |
| 5,053,939 | 10/1991 | Kirchberg, Jr. et al. | 363/41 |
| 5,065,304 | 11/1991 | Tamai et al. | 363/95 |
| 5,099,186 | 3/1992 | Roppel et al. | 318/803 |
| 5,103,147 | 4/1992 | Samann | 318/139 |
| 5,126,585 | 6/1992 | Boys | 363/37 |
| 5,224,028 | 6/1993 | Lipman | 363/41 |
| 5,235,503 | 8/1993 | Stemmler et al. | 363/37 |
| 5,245,500 | 9/1993 | Rozman | 361/56 |

*Primary Examiner*—John W. Cabeca
*Attorney, Agent, or Firm*—Leonard Bloom

[57] ABSTRACT

This invention provides cost-effective suppressing conducted radio-noise emissions from industrial inverter-motor drives whose EMI performance is able to meet the CISPR or FCC limits on conducted emissions. The invention includes some small size L,C filtering elements built inside the inverter, e.g., two grounding capacitance connected from both side of DC link to grounding heat sink of devices, a line capacitance across a DC link, three line capacitances across phase leads in AC input side of the diode rectifier, a zero sequence inductance both in each phase input and in each phase output lead of the inverter. Optionally, an extra secondary winding of the zero sequence inductor is connected to main circuit of inverter via a L, R, C network.

6 Claims, 19 Drawing Sheets

1 - INVERTER WITH MOTOR RUNNING
2 - INVERTER WITH OPEN OUTPUT
3 - FLOOR NOISE

INVERTER-FED MOTOR DRIVE WITH EMI SUPPRESSION

FIELD OF THE INVENTION

The present invention relates to inverters and more particularly, to cost-effective means for minimization Electromagnetic Interference (EMI) or Radio-Frequency Noise in inverter-fed motor drives.

BACKGROUND OF THE INVENTION

Commercial inverters, and specifically pulse width modulation (PWM) inverters, are often utilized for driving induction motors, and other industrial and domestic appliances. Referring to FIGS. 1A and 1B, a commercial inverter 10 and an induction motor 11 form a basic application configuration in industry. The inherent switching mode operation of these inverters leads to a plurality of problems caused by unwanted harmonics, which are the subject for minimization.

In this inverter-motor system, PWM operations of the inverter 10 generate large conducted emissions through the power leads which exceeds the Federal Communications Commission's (FCC) and International Special Committee on Radio Interference (CISPR) of International Electrotechnical Commission (IEC) limits on conducted emissions for digital devices by approximately 25 to 30 DBµV in the frequency range from hundreds of KHz to tens of MHz. The large impulse emission currents also cause waveform distortion of the line voltages, especially on the line to ground voltages and appear also in the line currents. The depth of the impulse notches could exceed 20% of the sine wave voltage. R.F. leakage currents that flow to the ground from the motor's frame or the inverter's enclosure produce a zero sequence current both at the input power leads 12 of the inverter 10 and at the output power leads that also generate harmful radiated emission.

The problems involved in harmonic control over the power frequency ranging up to the 35th order are already well addressed and an application guide has been provided in IEEE Std. 519-1992. However, in the case of Radio Frequency Interference (RFI) associated with the use of static converters, especially for the case of power drive systems, there has been no mandatory test requirement governing the unwanted noise produced nor has the problems concerned been well documented. On the other hand, the subject of Electromagnetic Interference (EMI) or RFI for information technology equipment have been an important aspect of those product's performance because Electromagnetic Compatibility (EMC) regulations for these devices have existed in most major countries. Digital devices having clock frequencies that exceed 9 kHz cannot be legally sold in the U.S. unless they have been tested and found not to exceed limits on radiated and conducted emissions set by the Federal Communications Commission (FCC). Also, countries in Europe have imposed similar requirements on digital devices. One of the most important standards setting organization for commercial EMC is CISPR, a committee well known as the International Special Committee on Radio Interference, which develops recommended EMC test limits and test procedures. Most countries use CISPR standards for their own regulations. The European Community (EC) approach has been to develop a common set of EMC requirements, which are collectively known as the European Norms (EN's) and are largely on CISPR and IEC standards.

It can now be said that the subject of EMC is of worldwide concern to manufacturers of digital products as it is a critical aspect in the marketability of their products. Thus far, concerns have focused mostly in low power level applications of digital devices as the FCC has temporarily exempted five subclasses of digital devices from meeting the technical standards of the requirements in 1987. One of these classes concerns industrial control systems used in an industrial plant, factory, or public utility. However, this exemption does not imply that EMC problems can be neglected in motor drive systems. It is generally recognized that the exempted devices are still subject to the general conditions of operation such that no harmful interference should be generated or that interference must be accepted that may be caused by the operation of an authorized radio frequency device. Also since the exemptions mentioned are temporary, the rules can be revised forcing major design problems for equipment manufacturers not designing for low EMI. In addition, with the new standards (European Norm) for inverter drive systems being proposed by CISPR, the subject of EMC has become a critical issue for inverter manufacturers to insure their products have good EMC performance and operate properly in their intended environment.

Although the subject of EMC is well documented on low power digital devices, applications of digital techniques in the higher power ranges concern situations different than with a signal processing system. Some issues particular to high power switching are important in establishing to what degree the power electronics system would produce and interfere with nearby electrical or electronic devices or systems.

Therefore, different measures have been undertaken in order to minimize conducted emissions. For example, U.S. Pat. No. 4,673,851 discloses a PWM DC motor operating system with RFI suppression in which a freewheeling diode is connected across the motor armature terminals and is switched by a FET. The switched current path comprises, in series, a DC power supply, a low pass filter including charge storage means, a DC motor armature, a field-effect transistor (FET) and a resistor. A capacitor is connected across the FET as well as a diode with minimal lead length to reduce stray inductance. The capacitor is effective to communicate voltage shifts across the resistor with FET switching to the cathode of the diode and thus serve as a source of supplemental current flowing through the diode during diode switching partially in preference to the charge storage means of the low pass filter, whereby the diode switching voltage spikes communicated through the low pass filter to the DC power supply are reduced in amplitude and frequency.

U.S. Pat. No. 5,103,147 proposed an operating device for consumers connected to the electric system of mobile units in which an interference eliminate circuit including a series coil and at least one capacitor for high capacitance is arranged between the electronic control system and the electric system of the mobile unit. The series coil is equipped with an iron-power core and designed in such a manner that no saturation is obtained even under maximum current condition so that a sufficiently high inductivity reserve remains available for pulse damping.

U.S. Pat. Nos. 4,800,478, 4,977,492, 4,994,951, 5,001,619, 5,053,939, 5,053,939, 5,065,304, 5,224,028 and 5,235,503 concern means for controlling PWM inverters with purpose of suppressing switching harmonics. For example, in U.S. Pat. No. 04,977,492, an inverter controller adjusts a selected switching pattern to accommodate minor variations and loads in the neighborhood of that pattern. The controller realizes in real-time the equivalent of an iterative solution of predetermined patterns. A number of representative pulse wide modulated (PWM) patterns are selected for a range of loads and link ripples. A portion of fundamental output is inserted onto the DC link to control one or more higher harmonics.

All these efforts will not be effective to suppress the RFI emissions caused by switching transient, voltage or current change rate, e.g. dv/dt or di/dt.

Traditionally, AC power line filters and isolated transformers are the normal means for the suppression of conducted emissions from digital devices in low power applications. However, these filters have restrict applications in higher power range due to their inherent disadvantages, such as extra volume and cost for installation; a strict grounding condition need for proper choice of insertion loss for common mode and differential mode with a specific application.

Also, since efficient suppression of EMI should be carried on the basis of understanding the sources causing EMI and suppressing it where it occurs, AC power line filters, being constructed independently, are not always competent to realize this criterion.

Therefore, it would be highly desirable to provide an industrial inverter with cost-effective and low-weighing means for EMI suppression.

SUMMARY OF THE INVENTION

Accordingly, a principle object of this invention is to provide for cost-effective EMC suppression circuits of a PWM inverter used for power drive systems, which is capable of suppression of EMI such that the conducted emissions from inverter-motor system are able to meeting CISPR or FCC emission limits for digital devices or for power drive systems.

This invention allows in an innovative way the suppression of conducted radio-noise emissions by 25 to 20 dBµV over the frequency range of 150 kHz to 30 MHz from a PWM inverter connected to an alternating current (AC) motor ranging from fractional to hundreds of horsepower so that the EMI performance of these kinds of system comes close to meeting the CISPR and FCC limits on conducted emissions for digital devices thus eliminating the necessity for separate power line filter in the circumstances that the conducted emissions of inverters must be restricted.

This invention permits a far more less cost implementation of an effective EMC design for inverter manufacturers by properly placing filtering elements C, L, R in the inverter itself associated with the power unit because these C, L, R elements chosen in this invention are in such small value of common types, e.g., zero-sequence inductor of few hundred henries and capacitors of tens or hundreds nanofarads, so that the increment in either the cost or the weight of converter will be little, which are merely a fraction of that of AC power line filters traditionally used.

This invention also provides some simple measures to establish some reliable overall EMC design considerations of power electronics systems to resolve its inherent disadvantage, e.g., very high level radio noise emissions from these systems, otherwise it will certainly leads to a critical electromagnetic environment problems in power system. Subsequently, this invention will be significant for the applications of power electronics.

The present invention finds its particular utility in an inverter-fed motor drive including an inverter connected between an AC power supply and an AC induction motor. The inverter includes phase input power leads, phase output leads, a DC link, a plurality of pairs of semiconductor switching devices connected in parallel to the DC line and a heat sink associated with said switching devices.

According to the present invention, an improvement to said inverter-fed motor drive for suppression radio noise emissions includes a first and a second grounding capacitance, connected between a respective side of the DC link and the heat sink, a line capacitance connected across the DC link, a zero sequence inductance inserted in each phase input power lead, and a zero sequence inductance inserted in each phase output lead.

The first and second grounding capacitance and said line capacitance are connected as physically close to the switching devices as possible.

The inverter may include a pulse width modulation (PWM) inverter.

An extra secondary winding connected between each of said phase input power leads and ground, and an extra secondary winding connected between each of said phase output leads and ground may be included for further improvement.

According to another aspect of the present invention, a pulse width modulation inverter includes an AC input, having three-phase input power leads, an AC output, having three-phase output leads, and a DC link. Three pairs of semiconductor switching devices are connected in parallel to the DC link. A heat sink is associated with said switching devices.

A first and a second grounding capacitance, each connected between respective side of the DC link and the heat sink, a line capacitance connected across the DC link, a zero sequence inductance inserted in each phase input power lead, and a zero sequence inductance inserted in each phase output lead improve EMI performance of each inverter.

The present invention finds its particular utility in inverter-fed motor drives for improvement in their EMI performance.

The proposed strategies in this invention also apply to a variety of switching mode operation converters, regardless of the number of phases of supply or the power range as well as the modulation mode.

BRIEF DESCRIPTION OF THE DRAWINGS

FIGS. 8A, 8D are diagrams of the experimental results of conducted emissions from the inverter-motor drive of the present invention.

DETAILED DESCRIPTION OF THE PREFERRED EMBODIMENT

Figure 1A:
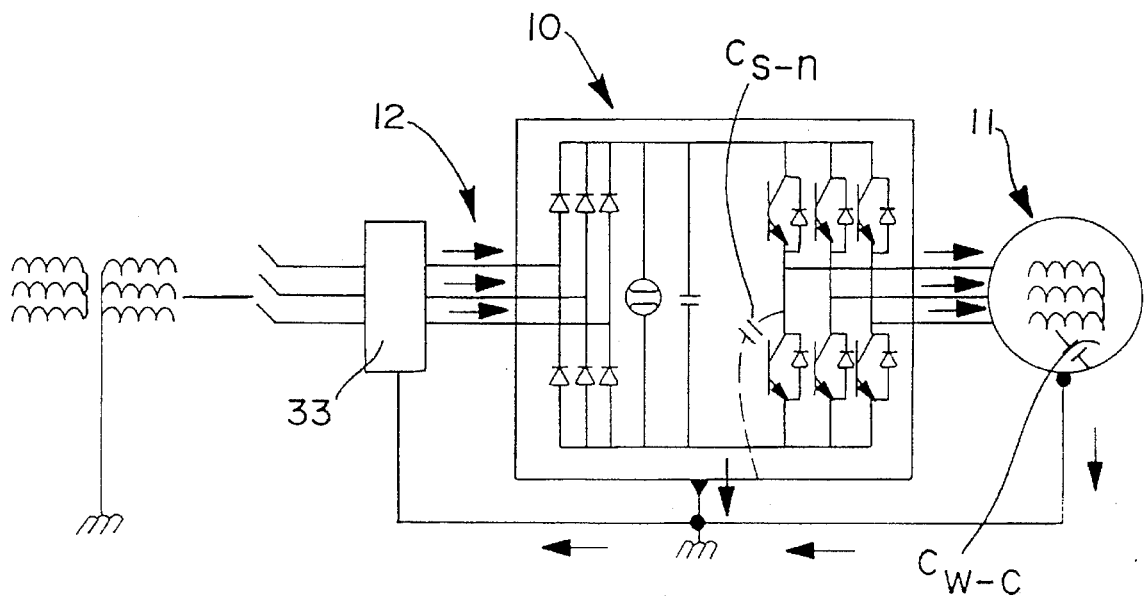
FIG. 1A is a schematic diagram of an inverter-fed motor drive of the prior art.
Figure 1B:
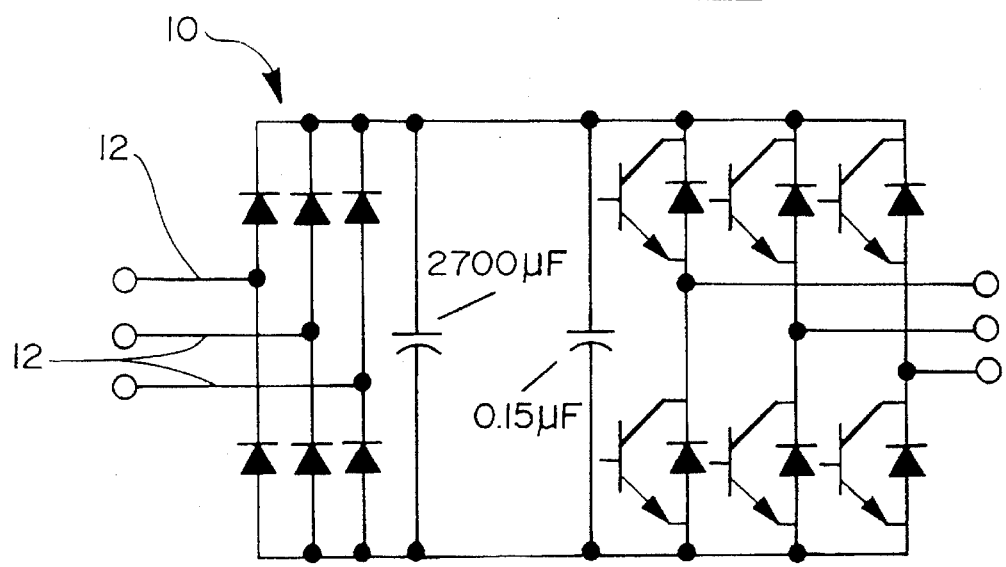
FIG. 1B is a schematic diagram of the main circuit of the inverter of the prior art.
Figure 1C:
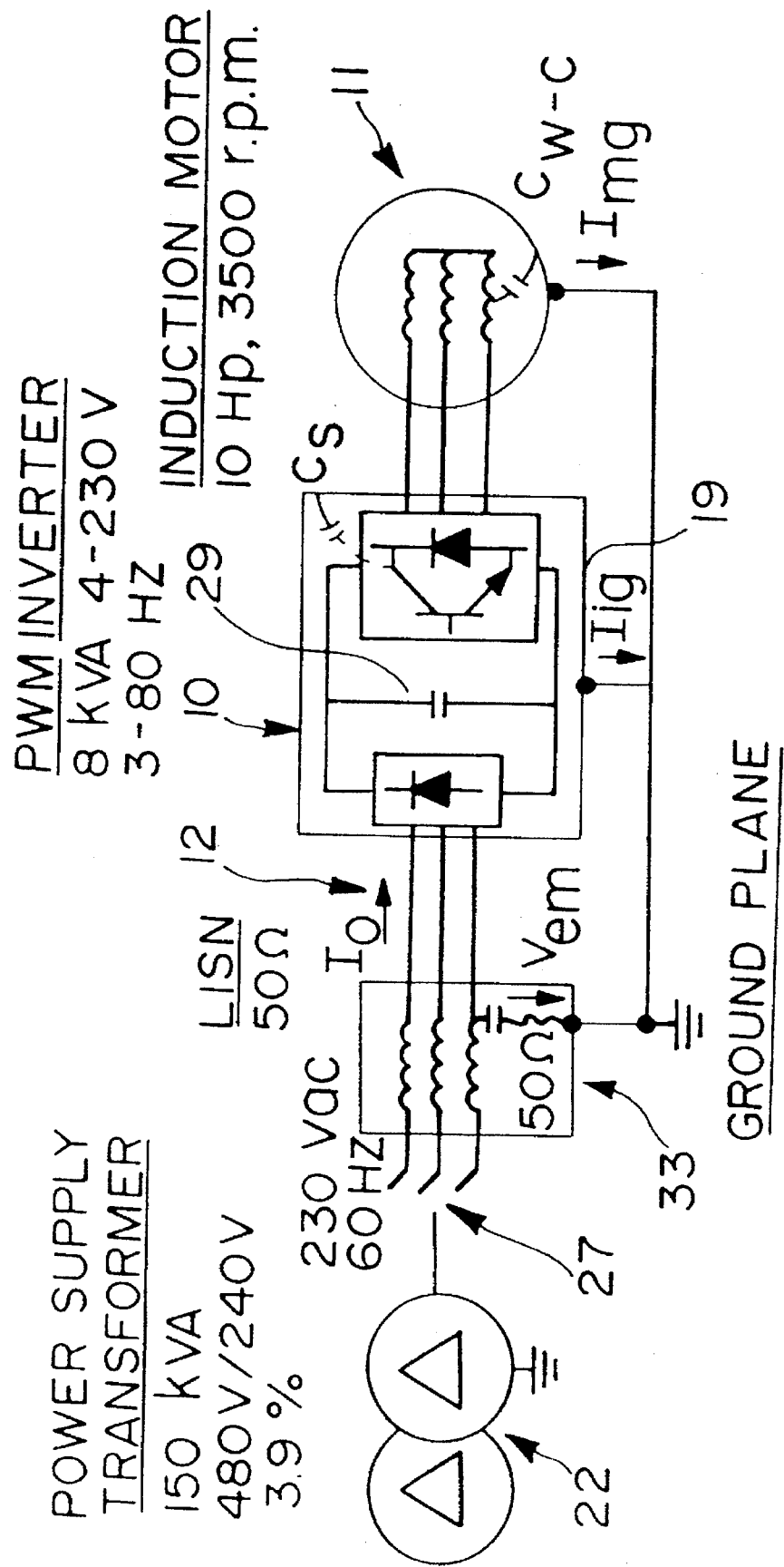
FIG. 1C is a schematical diagram of measurement of conducted radio noise emissions from the industrial inverter-motor drive.

Study on emissions from a commercial inverter shown in FIGS. 1A, 1B, 1C, were conducted. The commercial inverter 10 and induction motor 11, forming a basic application configuration in industry, was chosen as the Equipment Under Test (EUT) (best shown in FIG. 1C) for the measurements of the conducted emissions from the inverter 10. The specifications of the EUT are shown in Table 1.

TABLE 1

| Transistor Inverter | |
|---|---|
| Control System | Sinusoidal Wave PWM Control |
| BJT's modules (bipolar junction transistor) | 500 V, 40A |
| Feedback diodes | 500 V, 40A |
| Output voltage | 3-phase, 4 V–230 V |
| Output frequency | 3 Hz–80 Hz |
| Induction Motor | |
| Rating | 3-phase, 60 Hz, 10 Hp, 3500 rpm |
| Frame | 254 U |

A Line Impedance Stabilization Network (LISN), having the required impedance characteristic of 50 Ohm over the specified frequency range was constructed and inserted individually between the power mains and the inverter 10 (EUT). The LISN, EUT and all power lines among them were placed on a grounded aluminum plane 2×2 meters in size with the required configuration. The EUT was connected to ground at the LISN through a conductor.

For test instrumentation a spectrum analyzer with an appropriate attenuator was used with a peak detecting function so that the measured results are somewhat greater than quasi-peak detector function required by the FCC or CISPR, but they still represent an accurate level. Another instrument used for waveform observation was an oscilloscope. Both the analyzer and oscilloscope case were grounded at the same ground plane as specified. The power mains in the test site were supplied through 100 ft cables by a 150 KVA transformer shown in FIG. 1C. The conducted EMI from this inverter-motor system was measured by picking up the radio-noise voltage across the 50 Ohm resistor of the LISN during certain operating condition.

As a result of the studies conducted, the following conclusions have been made:

a. Switching mode operation of a PWM inverter used in inverter drive systems clearly generate large impulse currents through the power leads which are associated with problems of EMI and voltage waveform distortion in the power system and is generally more than that produced by low power information technology equipment. These type of power converters can cause critical situations for the electromagnetic environment.

b. The main emission sources of this system are the combination of switching action of devices (dv/ct) and the switched circuit parameters L,C,R. The derivative of line to ground voltage and the capacitance formed by circuit conductors and grounded frame of the power units which produce R.F ground currents flowing into the mains equivalent to an R.F. current source.

c. The differential mode emissions from this system are similar to the common mode but the distributed capacitance is between the conductors in different phases. Most DM emissions have already been absorbed by capacitors normally built into the power units.

d. The nonlinear devices existing in main circuit, such as diodes worsen the situation because they superimpose higher order harmonic components over the R.F. current.

e. Power line filters, the traditional means of suppression of EMI exhibit inherent disadvantages, such as extra volume and cost for installation; a strict grounding condition; need for proper choice of insertion loss for common mode and differential mode with a specific application.

Figure 2A:
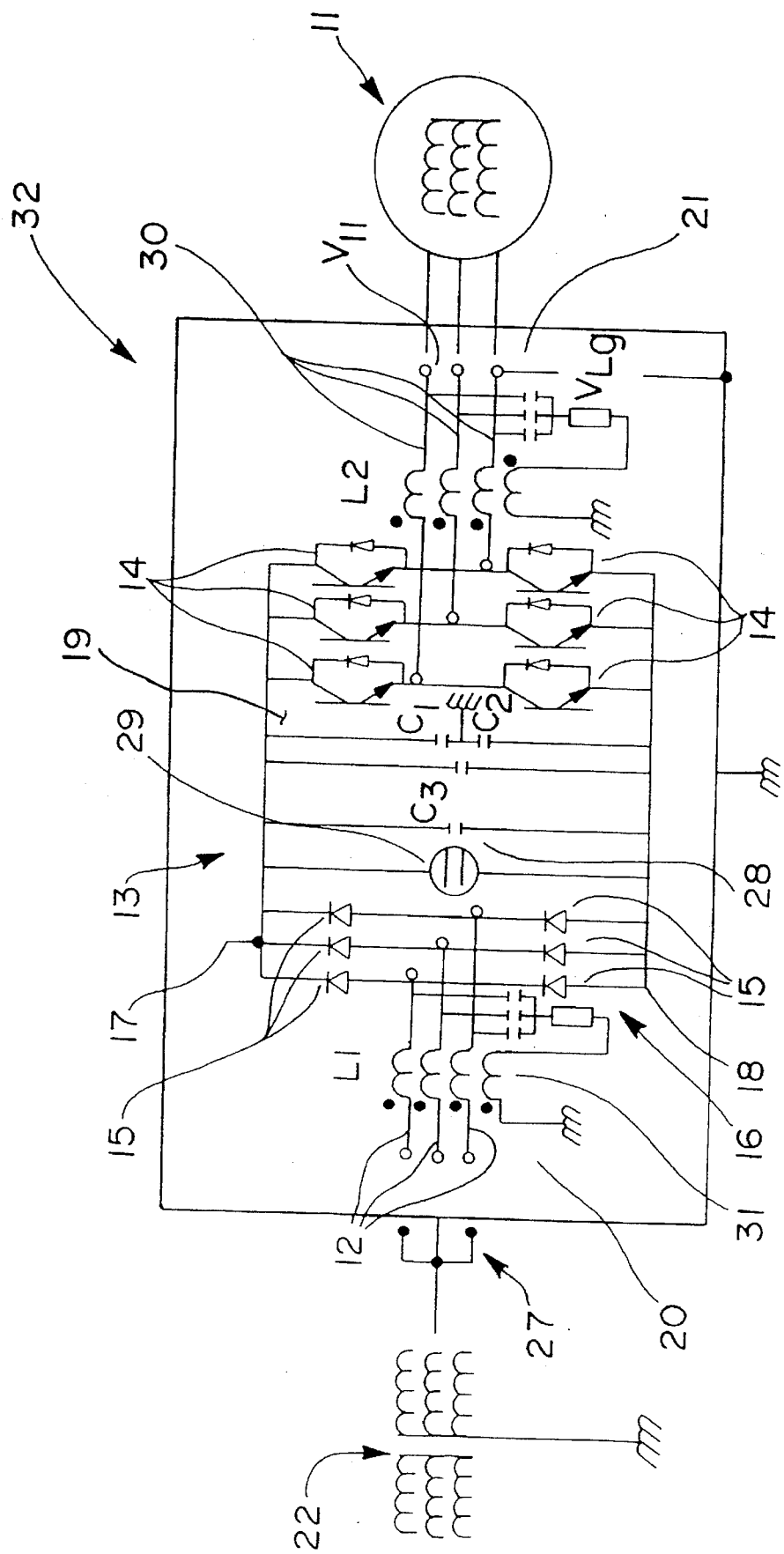
FIG. 2A is a schematic diagram of an inverter-fed motor drive of the present invention.
Figure 2B:
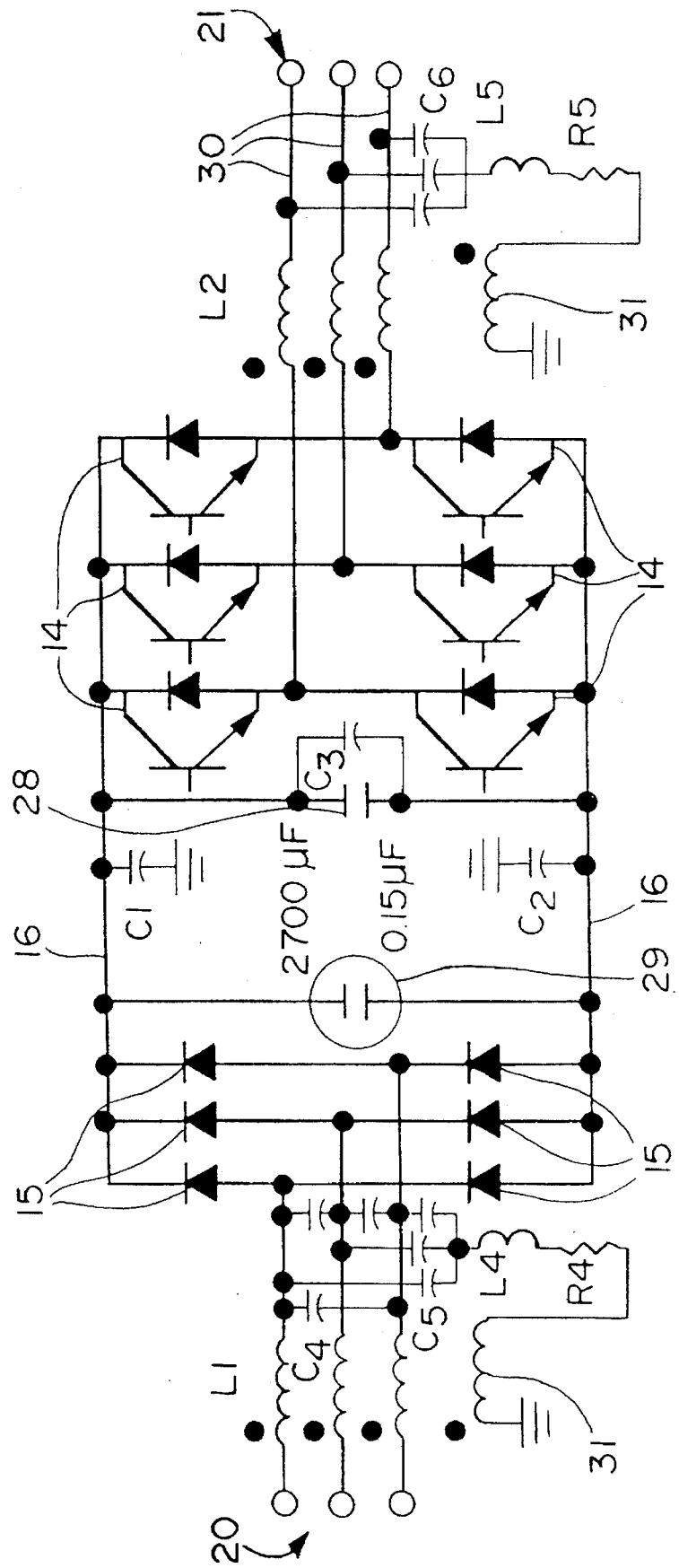
FIG. 2B is a schematic diagram of the main circuit of the inverter of the present invention.

Referring to FIGS. 2A and 2B the inverter 13 of the present invention includes switching devices 14 and diodes 15 which form a DC link 16 of the inverter 13. Grounding capacitances $C_1$ and $C_2$ are connected from both sides 17, 18 of DC link 16 to heat sink 19 close to switching devices 14.

Line capacitance $C_3$ is connected across the DC link 16 as physically close to the switching devices 14 as possible. A zero sequence inductance $L_1$ is inserted in each phase of the AC input 20 of the inverter 13. A zero sequence inductance $L_2$ is inserted in each phase of the AC output 21 of the inverter 13.

Three-phase induction motor 11 ranging to tens horse power by 25 to 30 dBµV over the frequency range of 150 kHz to 30 MHz is connected to the output 21 of the inverter 13. Three-phase transformer 22 supplies power to the inverter 13.

Although the present invention is described herein and shown in FIGS. 2A and 2B with reference to the PWM inverter and three-phase induction motor and power supply, it will be appreciated by those skilled in the art that this invention will apply in a variety of switching mode operation inverters, regardless of the number of phases of supply or the power range as well as the modulation mode.

Every switching operation (PWM or hard switching) of the switching devices 14 in the inverter 13 imposes a high voltage derivative dv/dt, grater than 1,000 volts per microsecond, not only on the line to line voltages $V_{ll}$ but also on the line to ground voltages $V_{lg}$ of the AC output 21. During the switching mode operation, the switched circuit, which is being connected to the switching devices 14, is always under an unsymmetrical state with respect to power supply (transformer) 22. The switched circuit has physically distributed stray capacitance and stray inductance that cannot be neglected in radio frequency range. These stray capacitances are formed among windings and a frame of the motor 11, as shown in FIG. 3, and also by a semiconductor and the heat-sink 19 of each switching device 14, as shown in FIG. 4.

Figure 3:
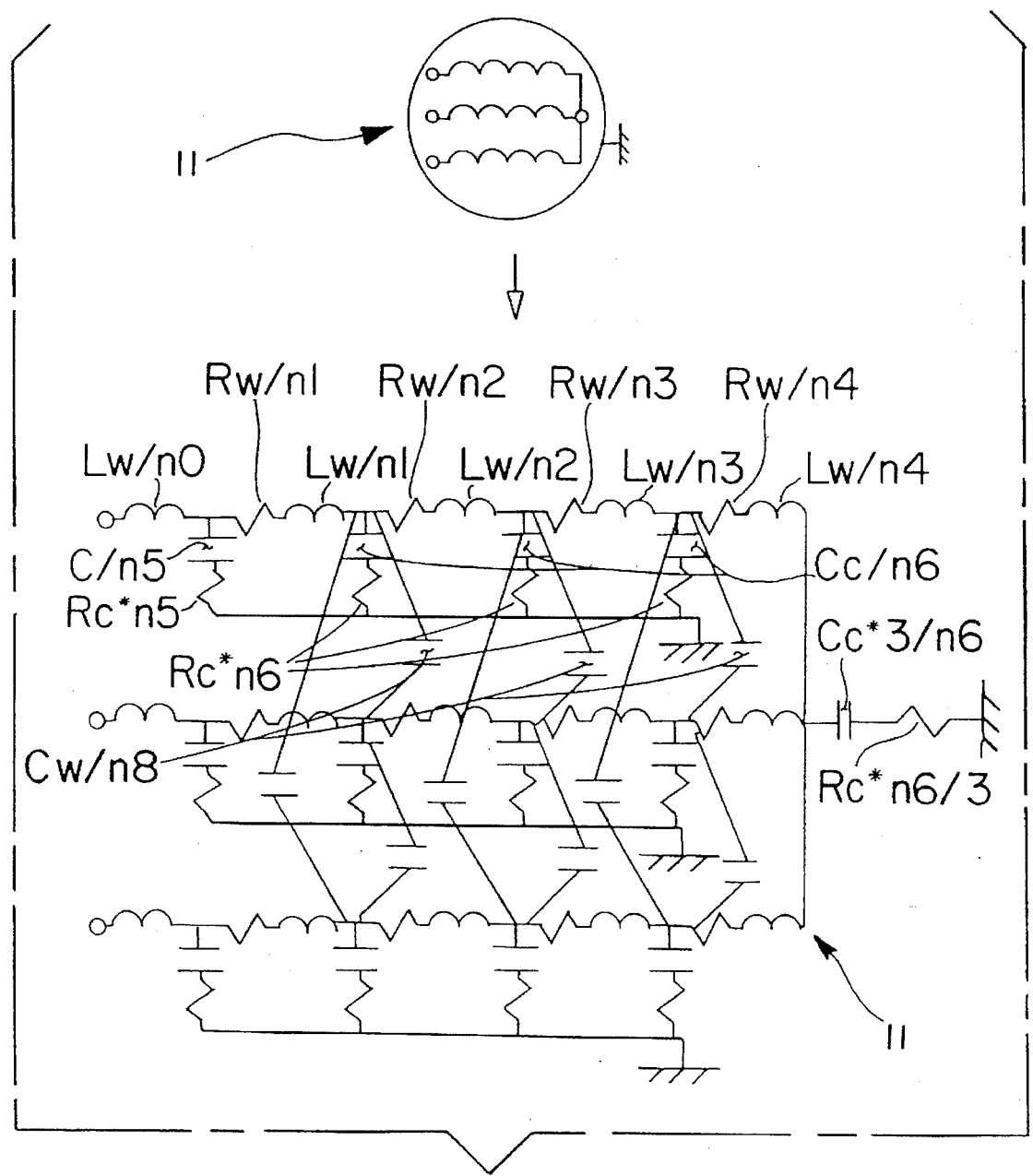
FIG. 3 is a schematic diagram of an induction motor for radio frequency.
Figure 4:
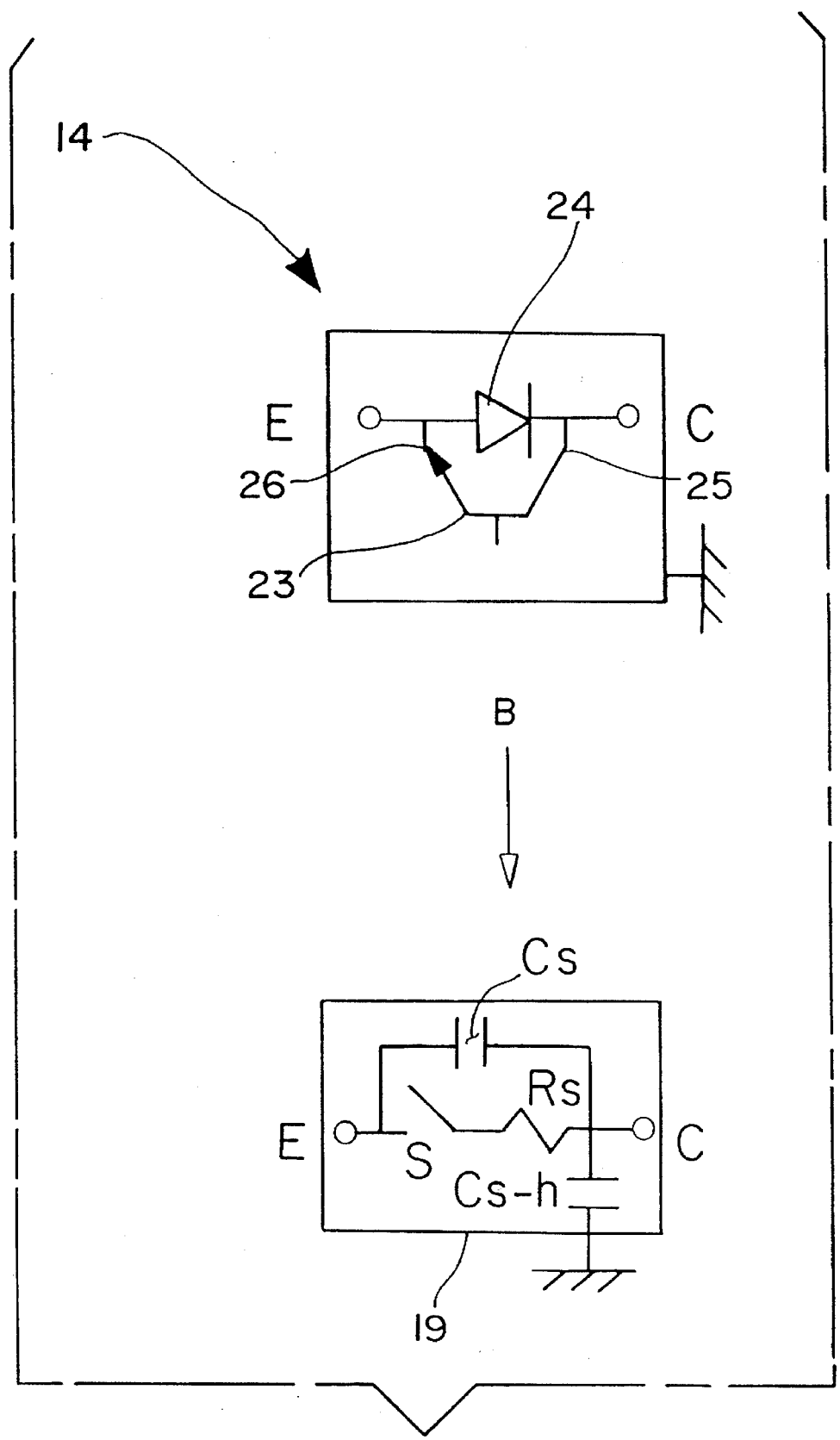
FIG. 4 is a schematic diagram of a switching device for radio frequency.
Figure 5:
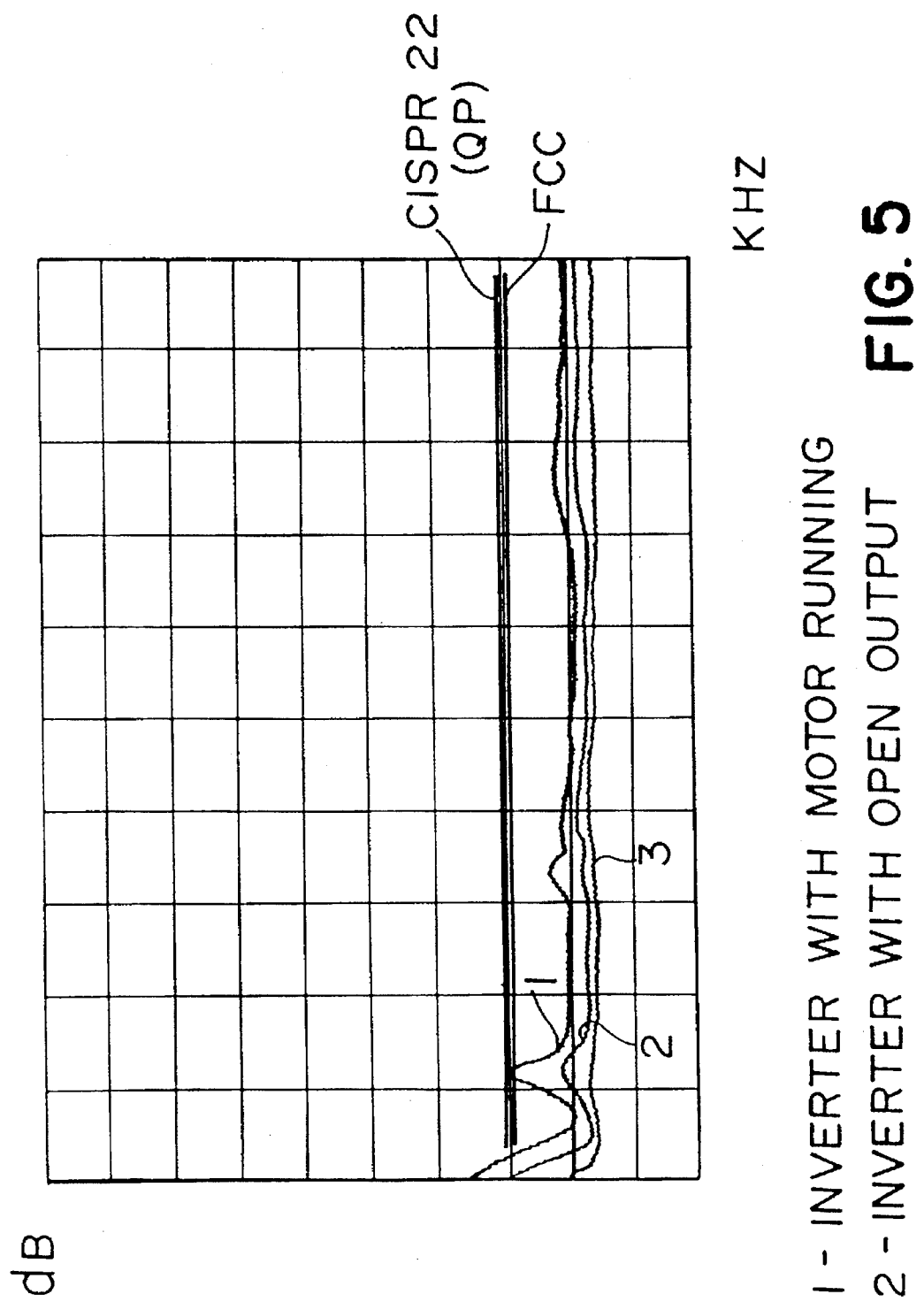
FIG. 5 is a diagram of conducted emissions from the inverter of the present invention.
Figure 6A:
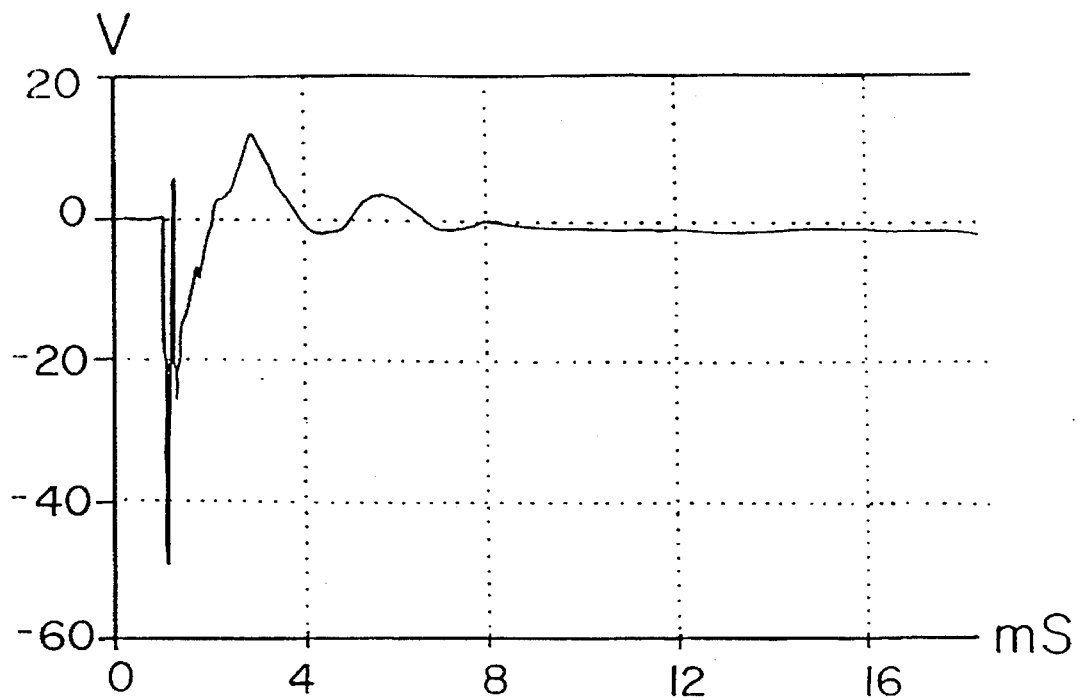
FIGS. 6A, 6B are diagrams of emission noise voltage from the inverter-fed motor drive of the prior art and the present invention, respectively.
Figure 6B:
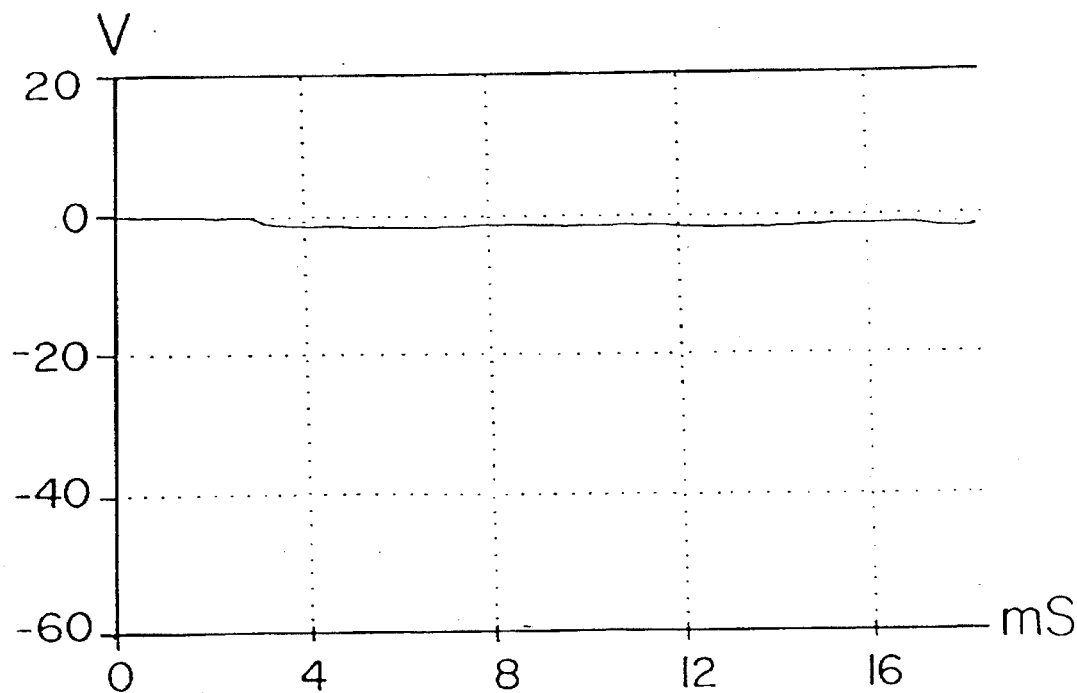
Figure 7A:
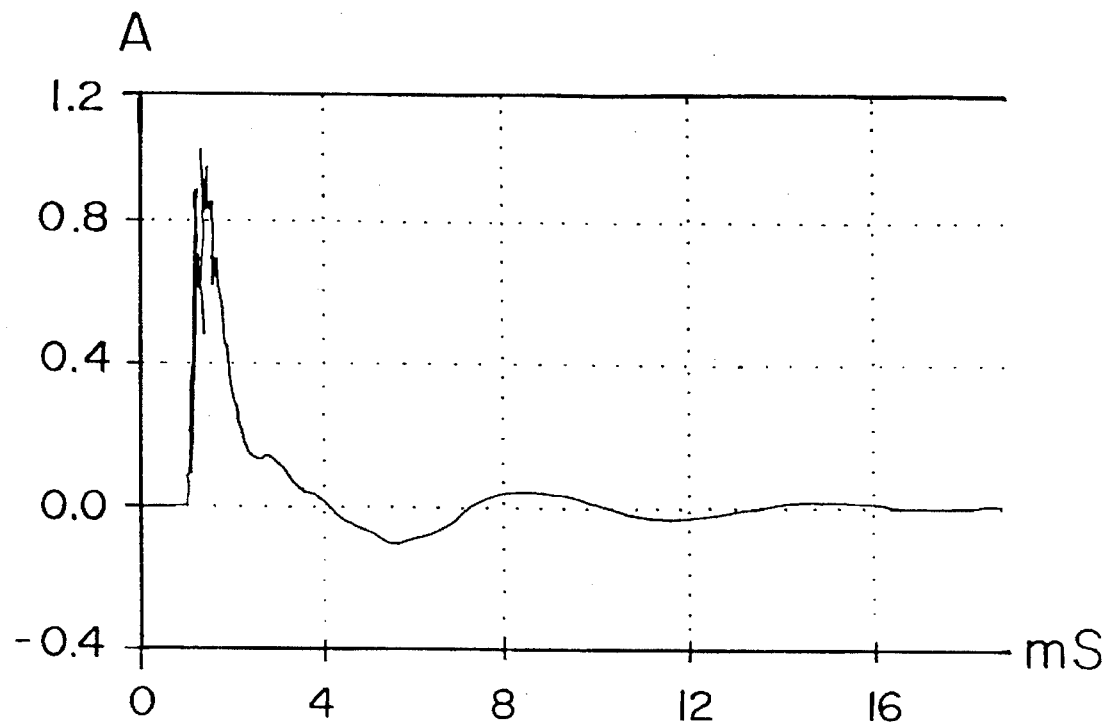
FIGS. 7A, 7B are diagrams of motor ground current of the inverter-fed motor drive of the prior art and the present invention, respectively.
Figure 7B:
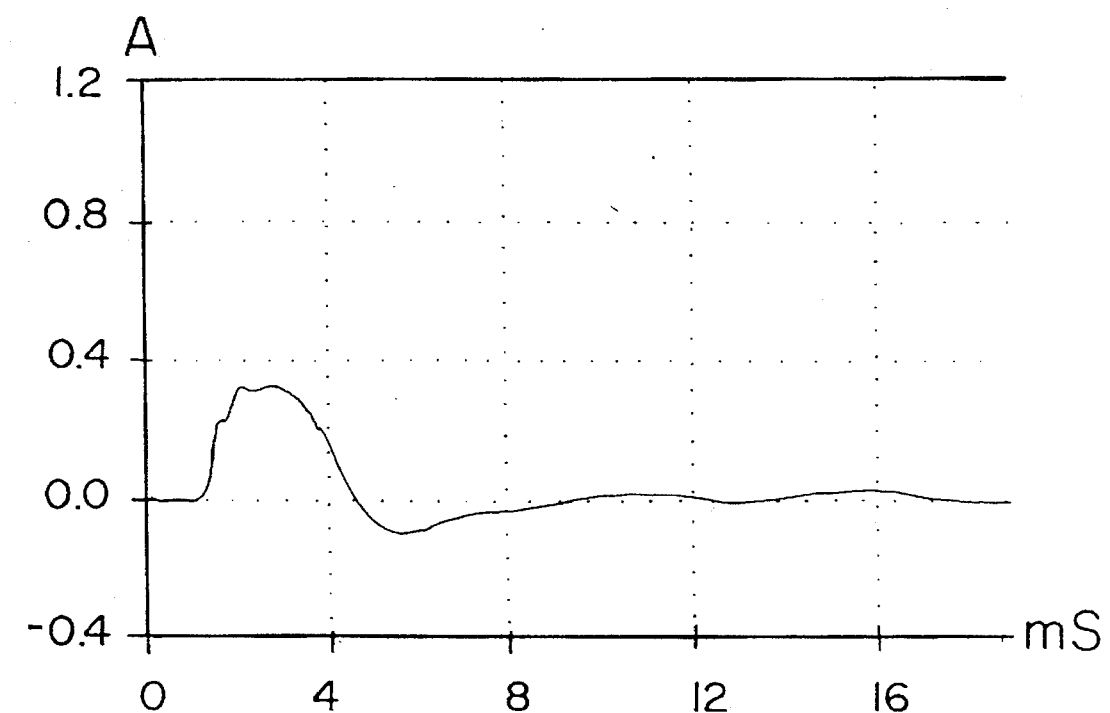
Figure 8A:
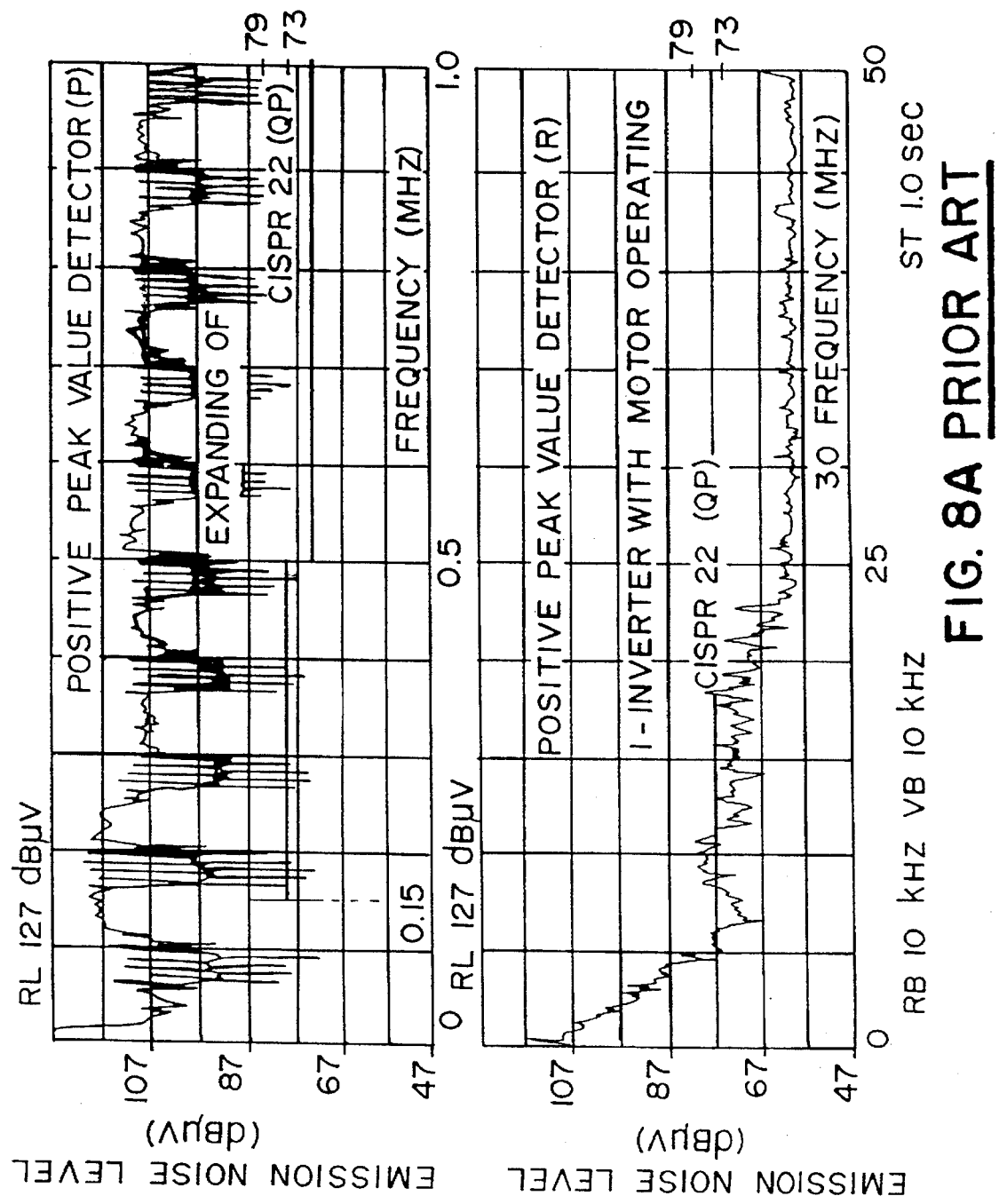
FIGS. 8A, 8B are diagrams of the experimental results of conducted emissions from inverter-motor drive of the prior art.
Figure 8B:
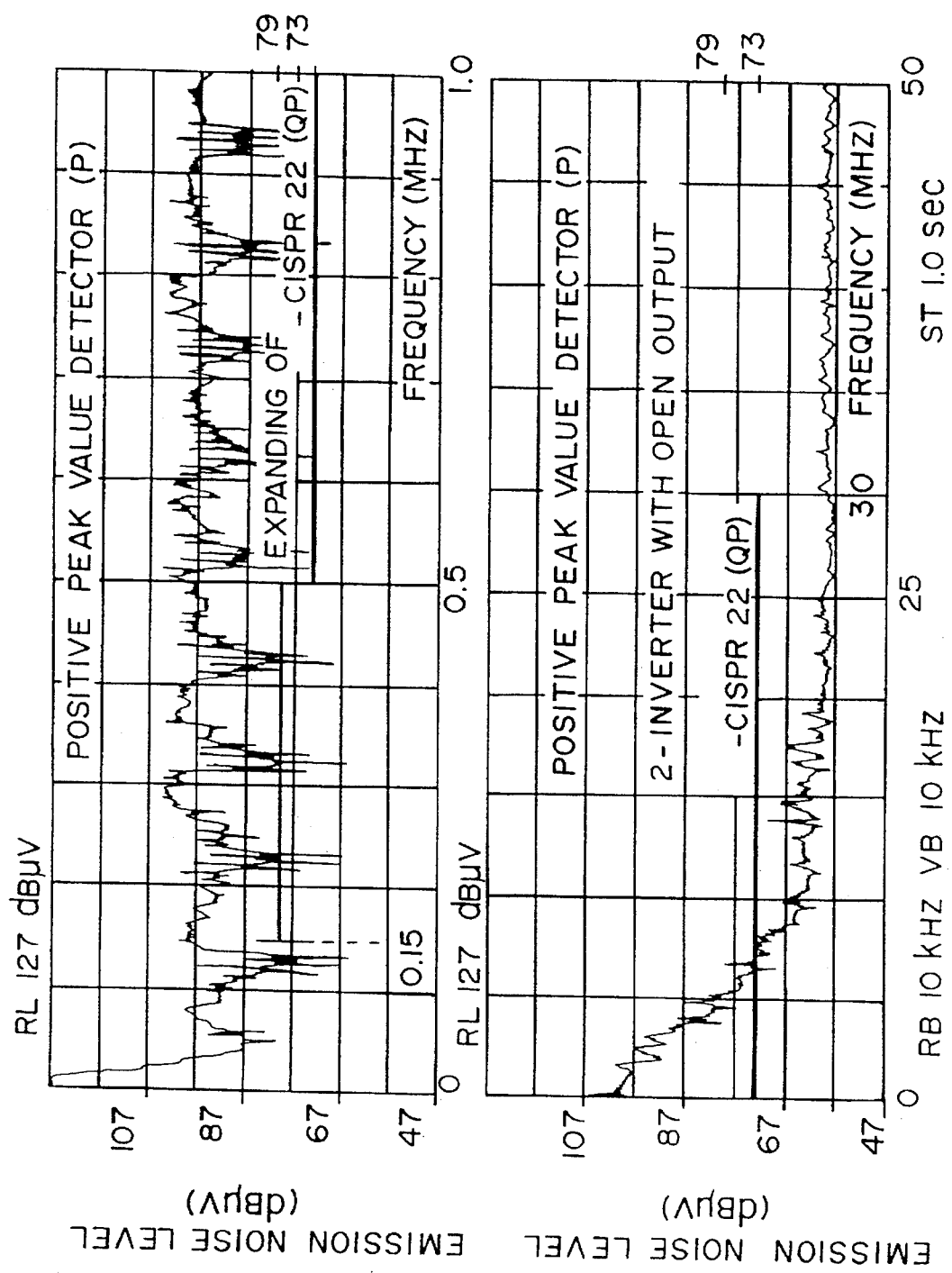
Figure 8C:
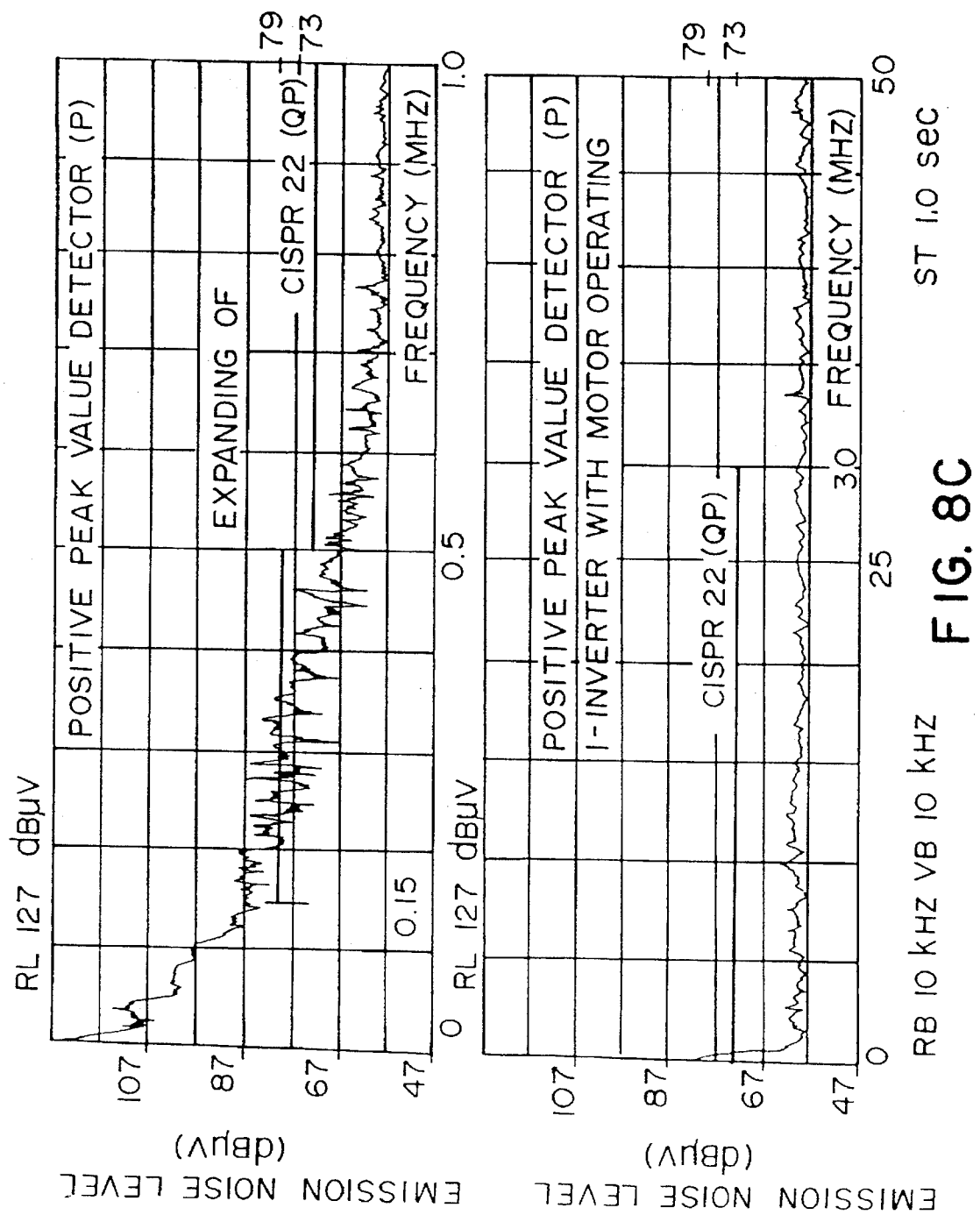
Figure 8D:
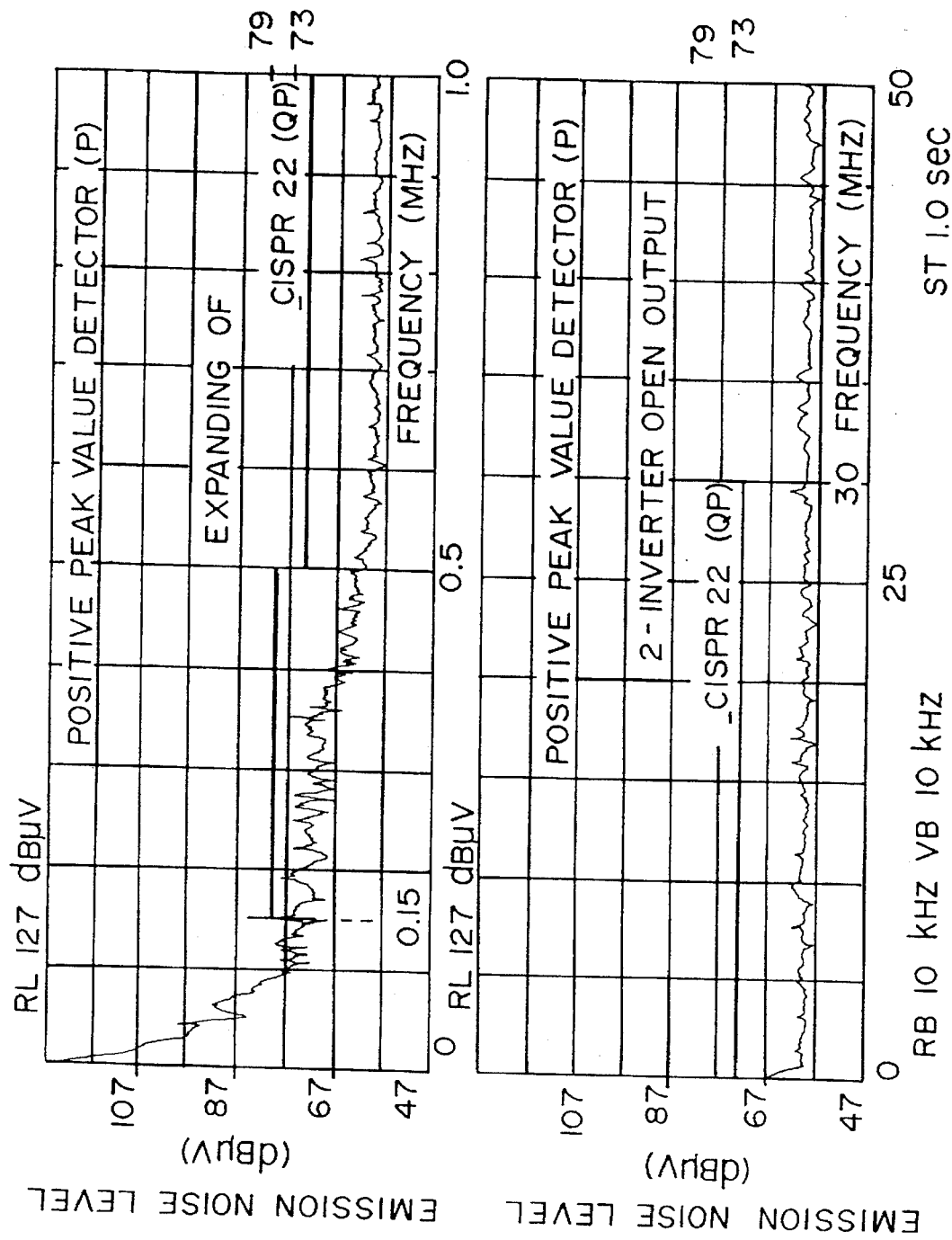
Figure 9A:
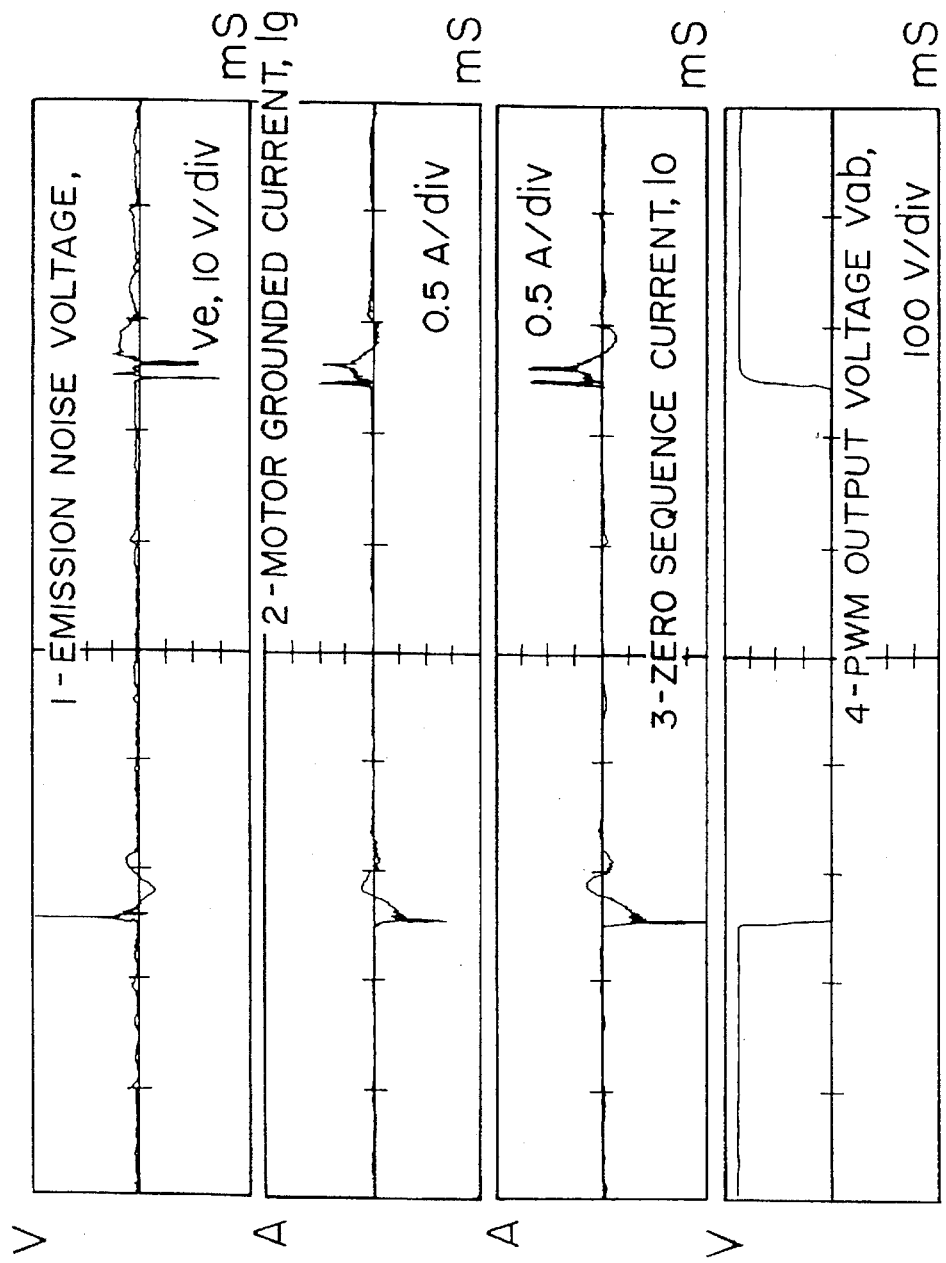
FIG. 9A is a diagram of the experimental results of conducted emission voltage and grounded currents from the invention motor-drive of the prior art.
Figure 9B:
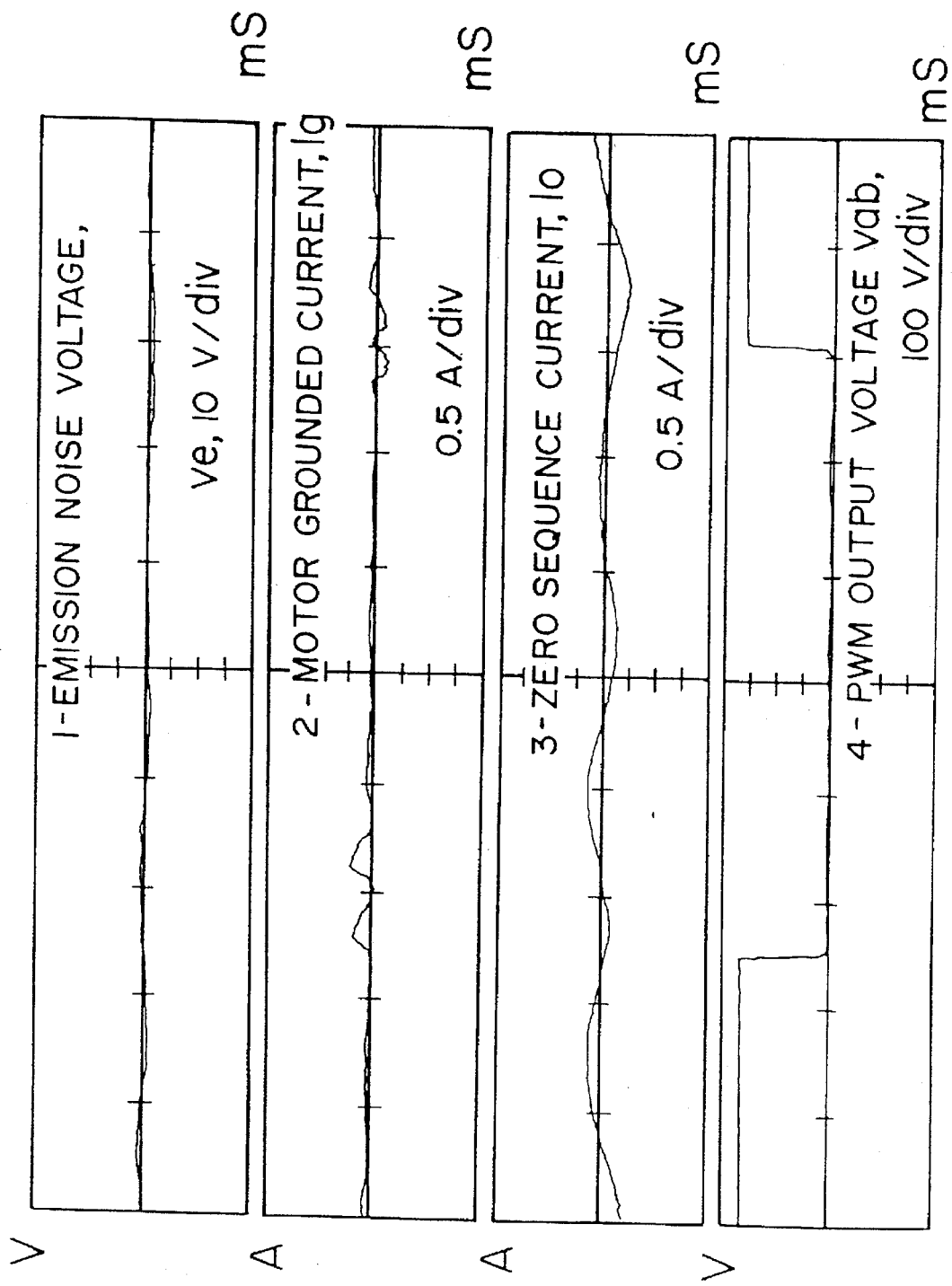
FIG. 9B is a diagram of the experimental results of emission noise voltages and grounded currents from the inverter-motor drive of the present invention.
Figure 10A:
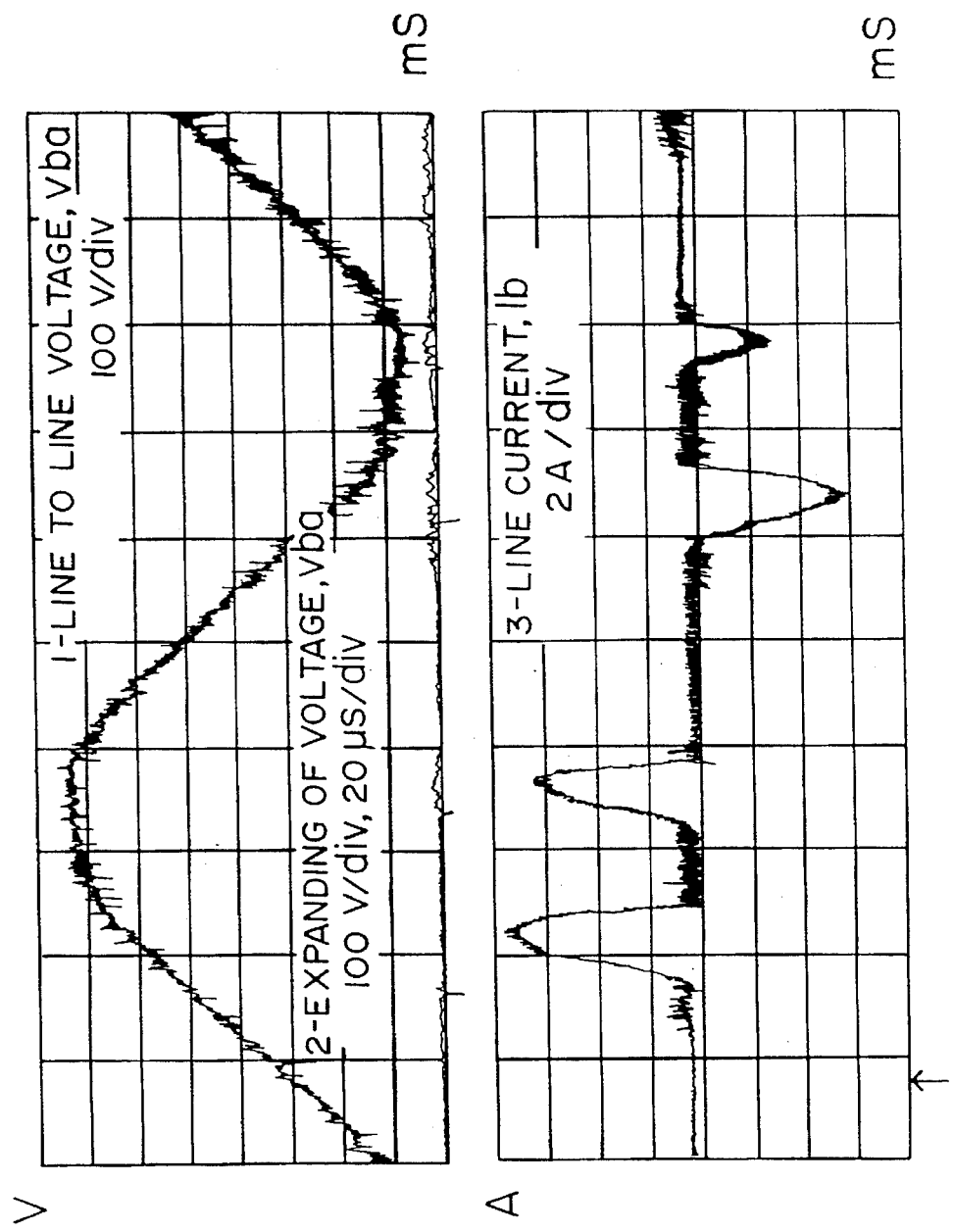
FIG. 10A is a diagram of the experimental results of line voltage and current waveform, while the inverter of prior art directly connected to power mains.
Figure 10B:
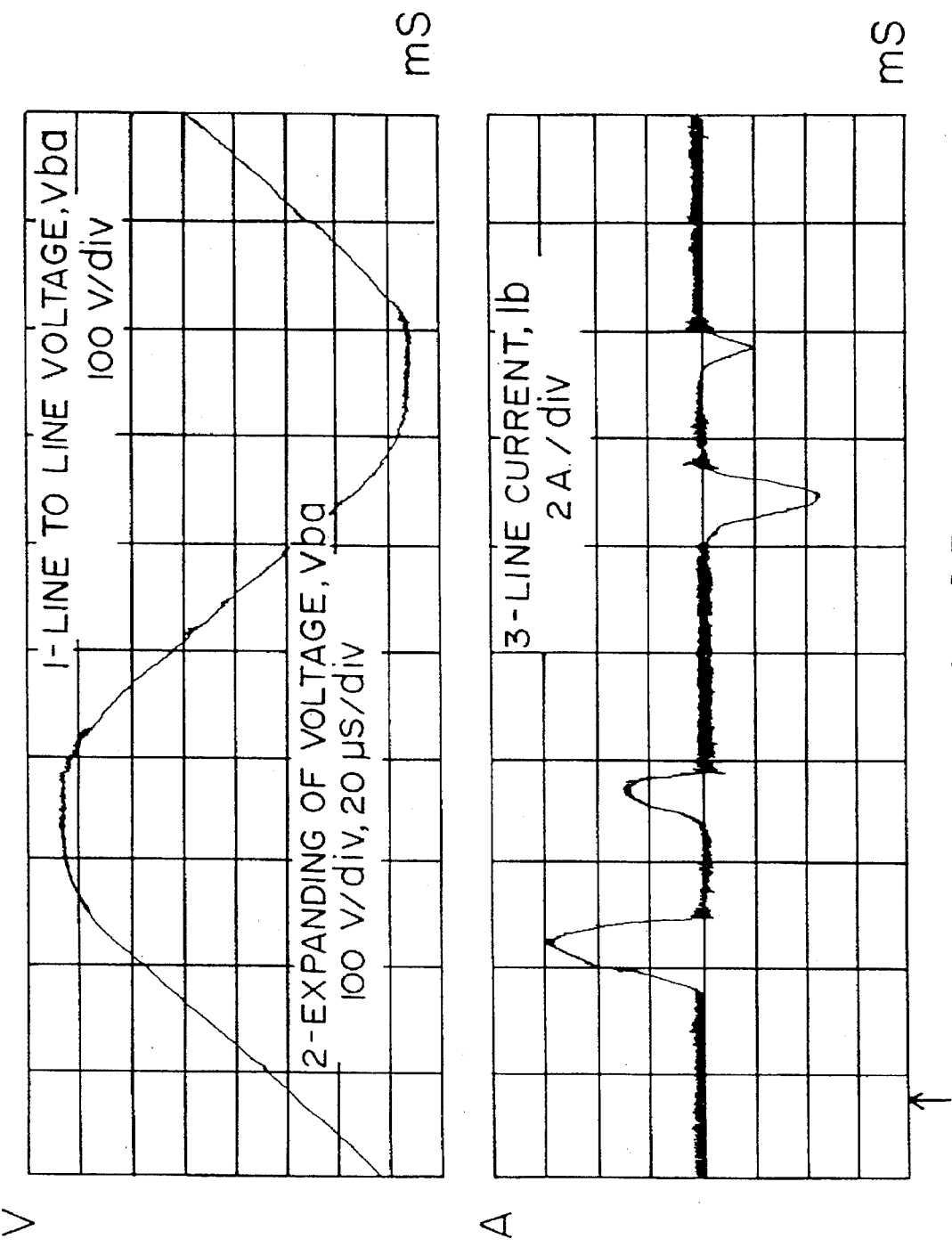
FIG. 10B is a diagram of line voltage and current waveform while the inverter of the present invention directly connected to power mains.

Referring to FIG. 3, the parameters $R_w$, $L_w$ are the primary resistance and leakage inductance of the motor 11 respectively; $C_c$ is the capacitance formed by the windings and iron core; $C_w$ is the capacitance formed between the windings in different phases of the motor 11. The core loss resistance $R_c$ and the coefficients n0, n1, n2 ... n9 represent the unevenly distributed portions of the bumped parameters of the motor 11 due to high frequency effect during the transient condition. Stray capacitance $C_c$ formed among the windings and the frame of the motor 11 ranges up to a few nanofarads in a common inductance motor (several horse power) and increases at higher motor capacitance. Referring to FIG. 4 the switching device 14, includes a modular type bipolar junction transistor 23 and a diode 24 which is connected between a collector terminal 25 and an emitter terminal 26 of the transistor 23. At radio frequency range the switching device 14 can be modeled as a switch S in series with a resistance $R_s$ and two capacitors $C_s$ and $C_{s-h}$. The capacitance $C_s$ is a junction capacitance involved in reverse recovery current. The capacitance $C_{s-h}$ is a grounded capacitance with respect to the heat-sink 19. The $C_{s-h}$ capacitance ranges to a fraction of a nanofarad in a power transistor.

Since the conductors on the current paths have stray inductance of about 10 Henries in this system as well as resistance, the switched circuits in the system, which consist of complexly distributed capacitance, inductance and resistance, dominates the spectrum of EM emissions.

During the switching transient charging/discharging current flows through the distributed capacitance to the grounded frame of the motor 11 and returns to power mains 27 along miscellaneous paths. This current may be considered as zero sequence current or common mode emission current which is of impulse damping oscillation waveform with complex wide bandwidth spectrum due to the distributed inductance and the losses. These radio frequency currents can be large enough to produce harmful electromagnetic interference (EMI).

On the other hand the capacitance $C_w$, formed by two windings in different phases of the motor 11 or the capacitance $C_s$ of the p-n junctions in semiconductor transistors 23 and diodes 24 also produce another type of R.F. currents flowing among the power leads 12 during each switching transient. This type of RF currents may be considered as differential mode emission, the transient of which is similar in the way with the common mode emission (or zero sequence current, as described hereinabove). Because there already exist surge absorbing capacitor 28 and capacitance bank 29 across the DC link 16 of the inverter 13 which function as a low pass filter, thus only a little differential mode emissions are observed in this case.

The conducted emissions on the power mains 27 may also be considered as the results caused by a noise source, which consists of switching devices 14 and switched circuits mentioned above. Since the impedance of switched circuit is greater over ten times than that of power supply 22 at radio frequency, the noise source may be considered as high impedance sources or current source with wide frequency band.

Referring again to FIG. 2, the grounding capacitance $C_1$ and $C_2$ are connected from both sides 17, 18 of the DC link 16 of the inverter 13 to the heat sink 19 close to switching devices 14, providing a physically shortest path and thus lowest impedance for radio frequency ground current source, flowing from switching device 14 and motor 11 frame. However, the total capacitance must be restricted to meet the AC leakage-current requirements for power units, i.e., 5 milliamperes set by UL (United Laboratory). For example, each capacitance $C_1$, $C_2$ is not bigger than 0, 022 μF; the sum of these capacitance is less than 0, 055 μF.

The line capacitance $C_3$ is connected across the DC link 16 as physically close to the switching devices 5 as possible. This capacitance $C_3$ provides a lowest impedance load for the differential mode radio frequency current sources, flowing from switching devices 14 such as reverse recovery current of diodes 24 as well as from the motor 11 frame. The capacitance $C_3$ can be fraction of a microfarad to provide low enough impedance for absorbing most differential mode emissions. The capacitance $C_3$ is also functions as surge absorbing capacitor.

Line capacitance $C_4$ can be connected across the AC power input leads close to the diode rectifier. These three capacitances can compensate for the reverse recovery currents of the diodes in the rectifier bridge.

Zero sequence inductance $L_1$ is inserted in each phase of the AC input 20 power leads 12 of the inverter 13 or in DC link 16, providing a high impedance for the radio frequency currents to the power mains 27. Since the magnetized current of the inductance $L_1$ is of zero sequence (common mode emissions) current with the value of merely a few amperes and its inductance of few hundred micro Henries is large enough for suppression of radio frequency, the inductance $L_1$ is designed to be minimized in the weight and the cost.

Zero sequence inductance $L_2$ also is inserted in each phase of the AC output 21 leads 30 of the inverter 13, which is able to decrease the derivative of output zero sequence voltages imposed on the motor 11 and thus suppress the high frequency components of MHz range in motor leakage current effectively while it is just hundred micro henries of inductance.

Along with common three phases primary windings, an extra secondary winding 31 associated with properly chosen circuitry, shown in FIG. 2, is employed to modify the spectrum of primary L, C filtering circuit and to decrease noise by 10 dBμV at MHz frequency range (150 KHz–30 MHz).

The modified inverter-fed motor drive 32 of the present invention provides to the RF emissions decreased by 35 to 45 dBμV in the frequency range from 0.15 to 30 MMa and come close to meeting the International Special Committee on Radio Interference (CISPR) and Federal Communications Commission (FCC) limits on conducted emissions as shown in TABLE 2 and FIGS. 5, 8A, 8B, 8C, 8D.

Furthermore, the waveform distortion of the line voltages and line current generally disappears FIGS. 9A, 9B, 10A, 10B.

Two types of commercially available RFI filters 33 (FIG. 1) were used to compare their EMI suppression performance with proposed new measures. The experimental results, shown in FIGS. 6A, 6B, 7A, 7B, demonstrate that the proposed inverter-fed motor drive 32 is efficient for the suppression of radio frequency emissions from these kinds of power electronics systems because the cost and the weight of the elements used are 5 to 10 times less than that of traditional AC power line filters 33 for implementation of the same filtering level. Traditionally, AC power line filters have been the normal means to suppress conducted EMI emissions. Two types of commercially available RFI filters were used to estimate their EMI suppression performance.

Figure 11:
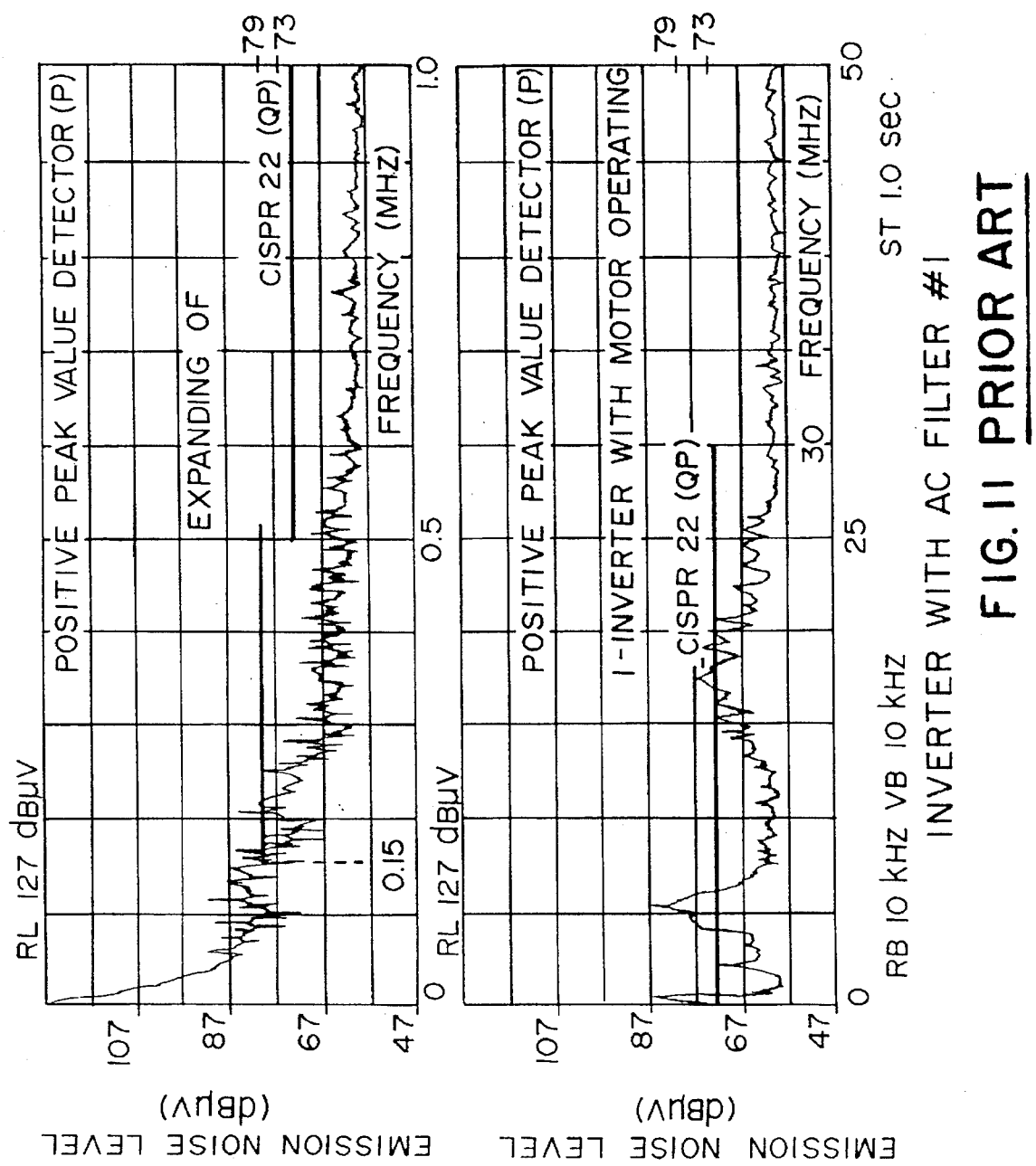
FIG. 11 is the experimental results of conducted emission level from AC power line filter #1 and the inverter of the prior art.
Figure 12:
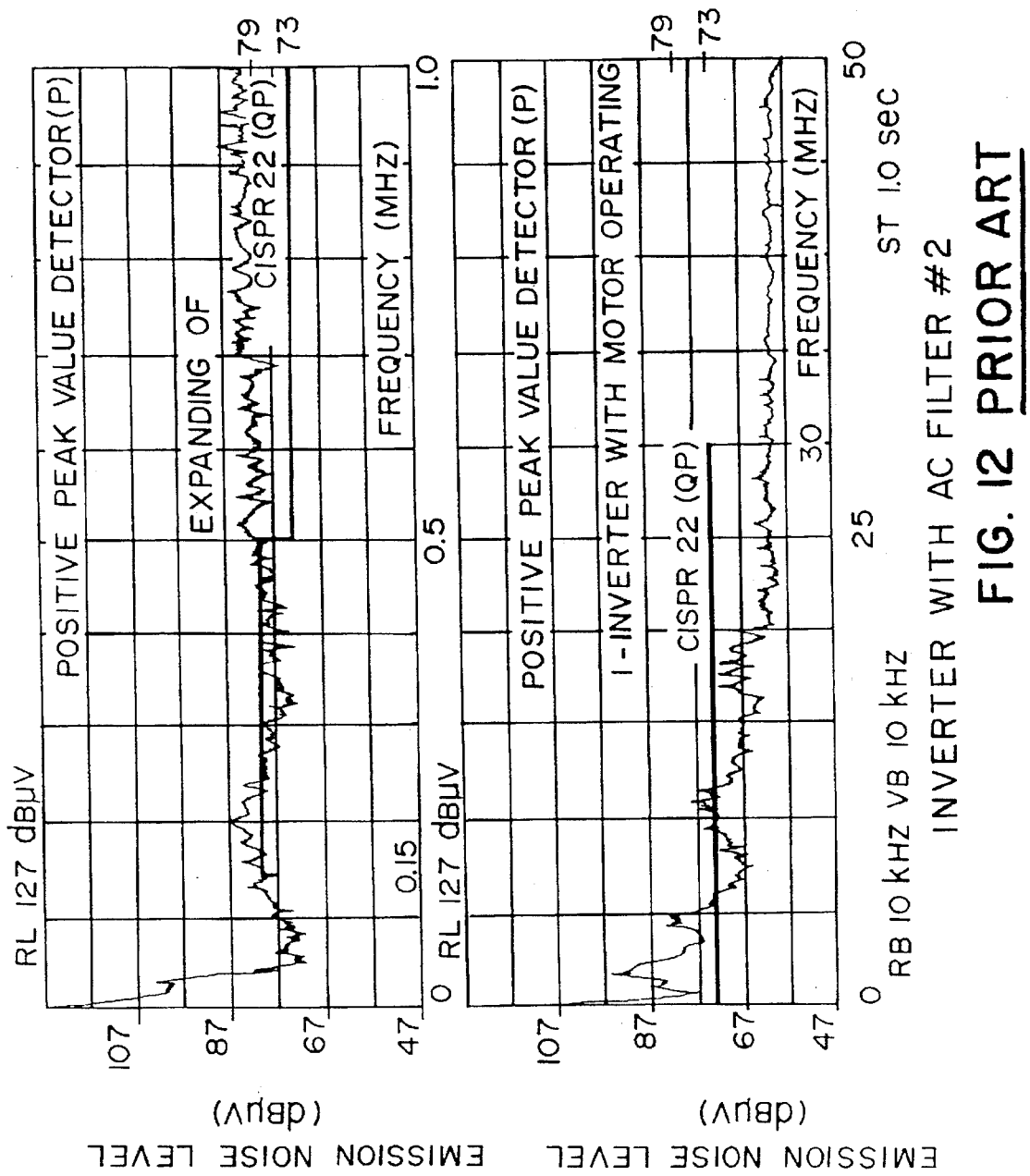
FIG. 12 is the experimental results of conducted emission level from AC power line filter #2 and the inverter of the prior art.

The experimental results, shown in FIG. 11 and FIG. 12, demonstrate that the EMI emissions have been suppressed by 20 to 45 dBµV and would probably meet both the CISPR's or FCC's conducted emissions requirements provided that their grounding provisions make direct low resistance contact with ground plane, otherwise, even depending on a wire of one foot in length would result in failure of compliance with standard limits, as shown in FIG. 11 and FIG. 12. However, both filters are bulky and several pounds in weight and would cost over ten percent of inverter's price. Therefore, manufacture of low EMI performance inverters at low cost will become feasible with the circuits disclosed.

TABLE 2

Comparison of EMI Suppression

| Frequency range (MHz) | 0.15 to 0.5 | 0.5 to 30. |
|---|---|---|
| Test conditions | (dBµV, Peak) | Maximum emission |
| Inverter (prior art) | 117 | 107 |
| Inverter (prior art) + Filter #1 | 85 | 85 |
| Inverter (prior art) + Filter #2 | 85 | 95 |
| Inverter (present invention) | 87 | 71 |
| CISPR limits (dBµV, Quasi-Peak) | 79 | 73 |

Filter #1: 3 × 20 A 250 V, Ld = 2.7 mH, Cg = 0.15 µF, Cl = 1µF
Filter #2: 3 × 30 A 250 V, Cg = 4.4 µF feed through type.
Note: One foot of length grounding lead was used with filter #1, #2 each.

As shown above, this invention allows, in a simply and innovative way, the suppression of conducted radio-noise emissions from a PWM inverter with an induction motor ranging to tens horse power by 35 to 45 dBµV over the frequency range of 150 Khz to 30 MHz. The EMI performance of this type of system comes close to meeting the CISPR and FCC limits on conducted emissions for digital devices thus eliminating the necessity for separate power line filter in the circumstances that the conducted emissions of inverters must be restricted.

This invention permits a far lower cost implementation of an effective EMC design for inverter manufacturers than conventional methods by properly placing filtering elements C, L, R in the inverter itself associated with the power unit. These C, L, R elements are chosen in this invention to be small values of common types, e.g., zero-sequence inductor of few hundred henries and capacitors of tens or hundreds nanofarads, so that the increment in either the cost or the weight of the inverters will be very small, merely a fraction of that of the AC power line filters traditionally used.

This invention also provides simple measures to establish some reliable overall EMC design considerations of power electronic systems to resolve its inherent disadvantage. That is, very high level radio noise emissions emanate from these systems, and will certainly lead to a critical electromagnetic environment problems in the power system unless corrected. Subsequently, this invention will be significant for the applications of power electronic converters (inverters) of a wide variety of types and applications. This is because the primary emission sources in these systems have been located in this work and several new strategies of suppression of EMI have been experimentally verified.

Summarizing the aforesaid, by properly placing filtering elements L, C, in the inverter itself associated with the power unit, e.g., a filter built into the converter, the applicants are able to establish an overall cost-effective EMC design. A proposed filtering circuit has been demonstrated in this paper to perform satisfactorily with the excellent effectiveness in suppression of EMI from the inverter drive so that it comes close to meeting the CISPR or FCC limits for digital devices. Furthermore, the cost and weight of the elements used are 5 to 10 times less than that of traditional AC power line filters for implementation of the same filtering level. Therefore, producing "clean" inverters with cost-effective EMC become feasible.

The measures, proposed in this paper are also feasible for resolving the problems existing in installed drive systems where EMI has become an annoying problem.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In an inverter-fed motor drive, wherein radio noise emissions may be conducted from an inverter, as the result of high power switching operations thereof, wherein the inverter is connected by its AC input to an AC power supply and by its AC output to an AC induction motor, the AC input having respective phase input power leads and the AC output includes respective phase output leads, wherein the inverter includes a DC link, the DC link having first and second sides, respectively, and a plurality of pairs of first and second switching devices, respectively, each pair being connected between the first and the second side, respectively, in parallel to the DC link, and wherein the inverter includes a heat sink associated with said switching devices, and thereby contributing to said radio noise emissions, said radio noise emissions having a differential mode caused by currents flowing between said phase input power leads, respectively, and between said phase output leads, respectively, and a common mode caused by ground current produced as a result of coupling between the heat sink and said switching devices, an improvement for suppressing the radio noise emission, both common and differential modes thereof, in the frequency band from 150 KHz to 30 MHZ, said improvement including:

a first and a second grounding capacitance, connected between the first and the second side of the DC link, respectively, and the heat sink, a line capacitance connected across the DC link, said first and second grounding capacitances and said line capacitance being connected as physically close to said switching devices as possible, a zero sequence inductance inserted in each said phase input power lead, a zero sequence inductance inserted in each said phase output lead, a first extra secondary winding connected between said phase input power leads and ground, and a second extra secondary winding connected between said phase output leads and ground, thereby suppressing said conducted radio noise emissions, both common and differential modes thereof.

2. The inverter-fed motor drive of claim 1, wherein the inverter is a pulse width modulation (PWM) inverter.

3. The inverter-fed motor drive of claim 1, wherein the AC power supply is a three-phase transformer.

4. The inverter-fed motor drive of claim 1, wherein the induction motor is a three-phase motor.

5. The inverter feed-motor device of claim 1, wherein each of the first and second switching devices includes a transistor and a diode coupled between a collector terminal and an emitter terminal of said transistor, respectively, wherein in each said pair the emitter terminal of the respective transistor of the first switching device is connected to the collector terminal of the respective transistor of the second switching device, wherein each said pair of the first and the second switching devices is connected in parallel to the DC link, such that collector terminals of respective transistors of said first switching devices are connected to the first side of the DC link, and wherein emitter terminals of respective transistors of said second switching devices are connected to the second side of the DC link.

6. In an inverter-fed motor drive, wherein an inverter for high power switching operations is connected by its phase input power leads to an AC power supply and by its phase output leads to an induction motor, the inverter having a DC link receiving said phase input power leads, the DC link including a first and a second side, respectively, a plurality of switching devices arranged in pairs of said switching devices, such that each pair being connected in parallel with said DC link, between said first and second sides, each phase output lead being connected to the respective pair of said switching devices, and a heat sink associated with said switching devices, wherein radio noise emissions may be conducted from the inverter, said radio noise emissions having a differential mode caused by currents flowing between said phase input power leads, respectively, and between said phase output leads, respectively, and a common mode caused by ground current produced as a result of coupling between the heat sink and said switching devices, a method of suppressing unwanted common and differential modes electromagnetic emissions in the frequency band from 150 kHz to 30 MHZ conducted from the inverter as the result of high power switching operations thereof, said method including the steps of:

connecting a first grounding capacitance between said first side and the heat sink, and connecting a second grounding capacitance between said second side and the heat sink;

connecting a line capacitance between the first and the second side of the DC link, respectively; and inserting a zero sequence inductance in each said phase input power lead and in each said phase output lead, respectively, and connecting a first extra secondary winding between said phase input power leads and ground, and a second extra secondary winding between said phase output leads and ground, respectively.

* * * * *